US006977693B2

(12) United States Patent
Aronovitz

(10) Patent No.: US 6,977,693 B2
(45) Date of Patent: Dec. 20, 2005

(54) NETWORKED VIDEO PROJECTOR APPARATUS AND METHOD OF PROJECTING A VIDEO FRAME ON A VIDEO PROJECTOR

(75) Inventor: David M. Aronovitz, Los Gatos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 864 days.

(21) Appl. No.: 09/879,770

(22) Filed: Jun. 11, 2001

(65) Prior Publication Data

US 2002/0186176 A1   Dec. 12, 2002

(51) Int. Cl.[7] .............................................. H04N 9/31
(52) U.S. Cl. ..................... 348/744; 348/745; 348/746; 348/806; 348/739; 345/719
(58) Field of Search ................ 348/744, 745, 348/746, 747, 751, 755, 771, 806, 807, 739, 348/794; 359/443, 896; 353/28, 30, 31, 122, 353/69, 70; 349/7, 5; 345/32, 719, 545, 546; 725/86, 87, 93, 116, 88, 76, 77

(56) References Cited

U.S. PATENT DOCUMENTS

| | | | | |
|---|---|---|---|---|
| 5,387,921 A | * | 2/1995 | Zhang et al. ............... | 345/102 |
| 5,515,076 A | * | 5/1996 | Thompson et al. ......... | 345/505 |
| 5,550,982 A | * | 8/1996 | Long et al. .................... | 725/93 |
| 5,764,311 A | | 6/1998 | Bonde et al. ............... | 348/746 |
| 5,835,715 A | | 11/1998 | Dahl ...................... | 395/200.39 |
| 5,924,013 A | | 7/1999 | Guido et al. ................ | 455/3.1 |
| 5,928,327 A | * | 7/1999 | Wang et al. ................. | 725/88 |
| 5,967,636 A | * | 10/1999 | Stark et al. .................. | 353/84 |
| 5,973,722 A | * | 10/1999 | Wakai et al. ................ | 725/76 |
| 6,002,454 A | | 12/1999 | Kajiwara et al. ........... | 348/806 |
| 6,191,827 B1 | | 2/2001 | Segman et al. ............. | 348/746 |
| 6,231,194 B1 | * | 5/2001 | Raj et al. .................... | 353/122 |
| 6,285,349 B1 | * | 9/2001 | Smith ......................... | 345/690 |
| 6,297,792 B1 | * | 10/2001 | Takahashi .................... | 345/91 |
| 6,317,108 B1 | * | 11/2001 | Kalt ............................. | 345/85 |
| 6,367,933 B1 | * | 4/2002 | Chen et al. .................. | 353/69 |
| 6,369,863 B1 | * | 4/2002 | Smith ......................... | 348/744 |
| 6,416,185 B1 | * | 7/2002 | Smith ......................... | 353/69 |
| 6,489,934 B1 | * | 12/2002 | Klausner ..................... | 345/1.1 |
| 6,530,666 B1 | * | 3/2003 | Smith et al. ................ | 353/121 |
| 6,542,134 B1 | * | 4/2003 | Raj ............................. | 345/32 |
| 6,597,410 B1 | * | 7/2003 | Doany et al. ............... | 348/744 |
| 6,609,797 B2 | * | 8/2003 | Ejiri et al. ................... | 353/69 |
| 6,624,854 B1 | * | 9/2003 | Isogai et al. ................ | 348/744 |
| 6,625,728 B1 | * | 9/2003 | Ahrens et al. ................. | 713/2 |

(Continued)

OTHER PUBLICATIONS

Sun Microsystems, Inc., Digital Media on the Sun Ray™ 1 Enterprise Appliance, 1999.

(Continued)

Primary Examiner—John Miller
Assistant Examiner—Jean W. Désir
(74) Attorney, Agent, or Firm—Park, Vaughan & Fleming LLP

(57) ABSTRACT

A video projector including a network adapter, a microprocessor physically and electrically coupled to the network adapter, a graphics adapter physically and electrically coupled to the microprocessor, a light valve physically and electrically coupled to the graphics adapter, and a light source physically coupled to the light valve. The video projector is operable to receive video data in digital form and the network adapter and the video projector is operable to transfer the video data to the microprocessor, the graphics adapter, and the light valve in digital form.

47 Claims, 2 Drawing Sheets

Figure 1:
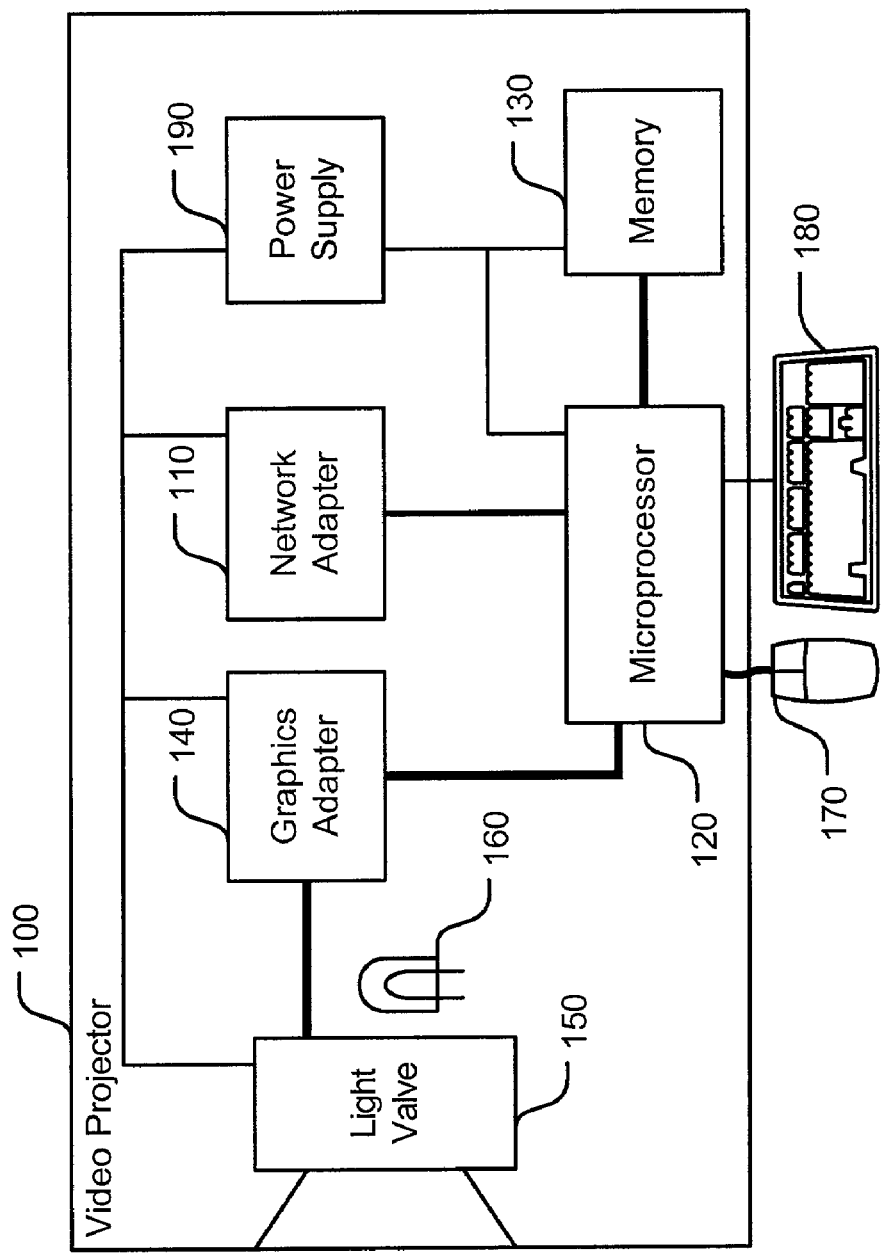

U.S. PATENT DOCUMENTS 6,636,918 B1 * 10/2003 Aguilar et al. .............. 710/303

OTHER PUBLICATIONS

Schmidt et al., The interactive performance of SLIM: a stateless, thin-client architecture, 1999.

Sun Microsystems, Inc., SUN RAY™ 150 APPLIANCE, 2001.

Sun Microsystems, Inc., Sun Ray™ Appliances, 2001.

Sun Microsystems, Inc., Sun Ray 1 Enterprise Appliance Overview and Technical Brief, 1999.

* cited by examiner

NETWORKED VIDEO PROJECTOR APPARATUS AND METHOD OF PROJECTING A VIDEO FRAME ON A VIDEO PROJECTOR

1. FIELD OF THE INVENTION

The present invention generally relates to networked computing devices. More specifically, the present invention relates to apparatuses and methods for controlling the projection of images from a computer device that is networked with a second computer, such as a server.

2. BACKGROUND

Networked computing devices very often operate in a client and server relationship. In such a relationship, a client program running on a first computing device may make service requests of another program running on a second computing device called a server. The server fulfills the request made by the client. Thus, the client/server model has the potential to provide efficient allocation of tasks to various computing devices that are appropriate to the respective computing devices.

One type of client/server model is a thin-client architecture. As the name suggests, in a thin-client architecture, the client possesses minimal computing power, and the server performs the vast majority of the processing that is accomplished. One particular type of thin-client architecture that has been developed by Sun Microsystems, Inc. of Palo Alto, Calif. is the Stateless, Low-level Interface Machine ("SLIM"). An embodiment of this SLIM has been developed by Sun Microsystems under the trademark SUN RAY. A SLIM is called "stateless" because the state of the program that is running on the machine is not recorded in the machine. Instead, the state is maintained on the server with which the SLIM interacts. Consequently, a SLIM does not need to maintain the hardware and software that is necessary to track state. A SLIM only maintain states with regard to its input/output devices. A memory located on the SLIM may be used to reduce network traffic between the SLIM and the server by maintaining a transient state. For example, a local frame buffer in the SLIM may be used to record the state of video data provided for display by the SLIM. Therefore, changes in the display may be made by only sending updates to portions of the memory that require alteration for an updated display.

A SLIM is considered "low-level" because it performs practically no processing on the information it exchanges with the server. A SLIM interacts with a server using raw input/output data. Therefore, a SLIM is not required to maintain the complex hardware and software that are needed to perform computationally complex functions.

A SLIM, therefore, is a very effective fixed-function appliance. By implementing a simple, low-level protocol, a SLIM can be a computer terminal, a data input device, a data output device, or some combination of these. Example input/output capabilities include but are not limited to universal serial bus, stereo input/output, display information, composite video, and red-green-blue ("RGB") video. Consequently, current implementations of a SUN RAY machine can output information to a projection device.

There presently exist in the marketplace projection devices that will receive red-green-blue (RGB) information from a computer. A common type of projector currently being offered in the marketplace is a liquid crystal display ("LCD") projector. A typical means of employing an LCD projector is to connect the projector to a personal computer so that graphical representations generated on the personal computer can be magnified and shown to a large group of people. However, such connections between the projector and the computer are often difficult to accomplish in a timely manner. In addition to connector types, scan and resolution compatibilities must be negotiated. It would be advantageous to avoid such difficulties by integrating a projector with a computing device. Further, it would be advantageous if the computing device was not a relatively complex and expensive personal computer, but instead a SLIM computing device.

It would also be very desirable to use a SLIM device and server combination projector to control various aspects of the image being projected, such as the brightness, contrast, tint, and image shape. Because all image rendering is accomplished on the server, sufficient processing power is available to control these and other aspects of an image. An image aspect of particular concern with typical projector technology is the trapezoidal shape of an image projected toward a surface that is not perpendicular with the direction of projection. It would be a significant improvement in the art to provide systems and methods that could employ the power of a server computer to manipulate and control various aspects of a projected image, yet provide an economical, integrated, client projector computing device.

3. SUMMARY OF THE INVENTION

One embodiment of the invention is a video projector. The video projector includes: a network adapter; a microprocessor physically and electrically coupled to the network adapter; a graphics adapter physically and electrically coupled to the microprocessor; a light valve physically and electrically coupled to the graphics adapter; and a light source physically coupled to the light valve. The video projector is operable to receive video data in digital form and the network adapter and the video projector is operable to transfer the video data to the microprocessor, the graphics adapter, and the light valve in digital form.

Another embodiment of the invention is a video projector. The video projector includes: a power supply; a network adapter physically and electrically coupled to the power supply; a microprocessor physically and electrically coupled to the power supply and the network adapter; a graphics adapter physically and electrically coupled to the power supply and the microprocessor; a light valve physically and electrically coupled to the graphics adapter; and a light source physically coupled to the light valve. The power supply is operable to supply power to the network adaptor, the microprocessor, the graphics adapter and the light valve.

Another embodiment of the invention is a method of projecting a video frame on a video projector. The method includes: inputting data into the video projector; based at least in part upon the data, sending a video modification command from the video projector to a server; based at least in part upon the video modification command, generating a video frame; sending at least a portion of the video frame from the server to the video projector; and projecting at least a portion of the video frame.

Still another embodiment of the invention is a method of modifying a virtual frame buffer on a server. The method includes: receiving a data packet from a video projector; extracting a video modification command from the data packet; and based at least in part upon the modification command; modifying the virtual frame buffer.

4. BRIEF DESCRIPTION OF THE FIGURES

Figure 2:
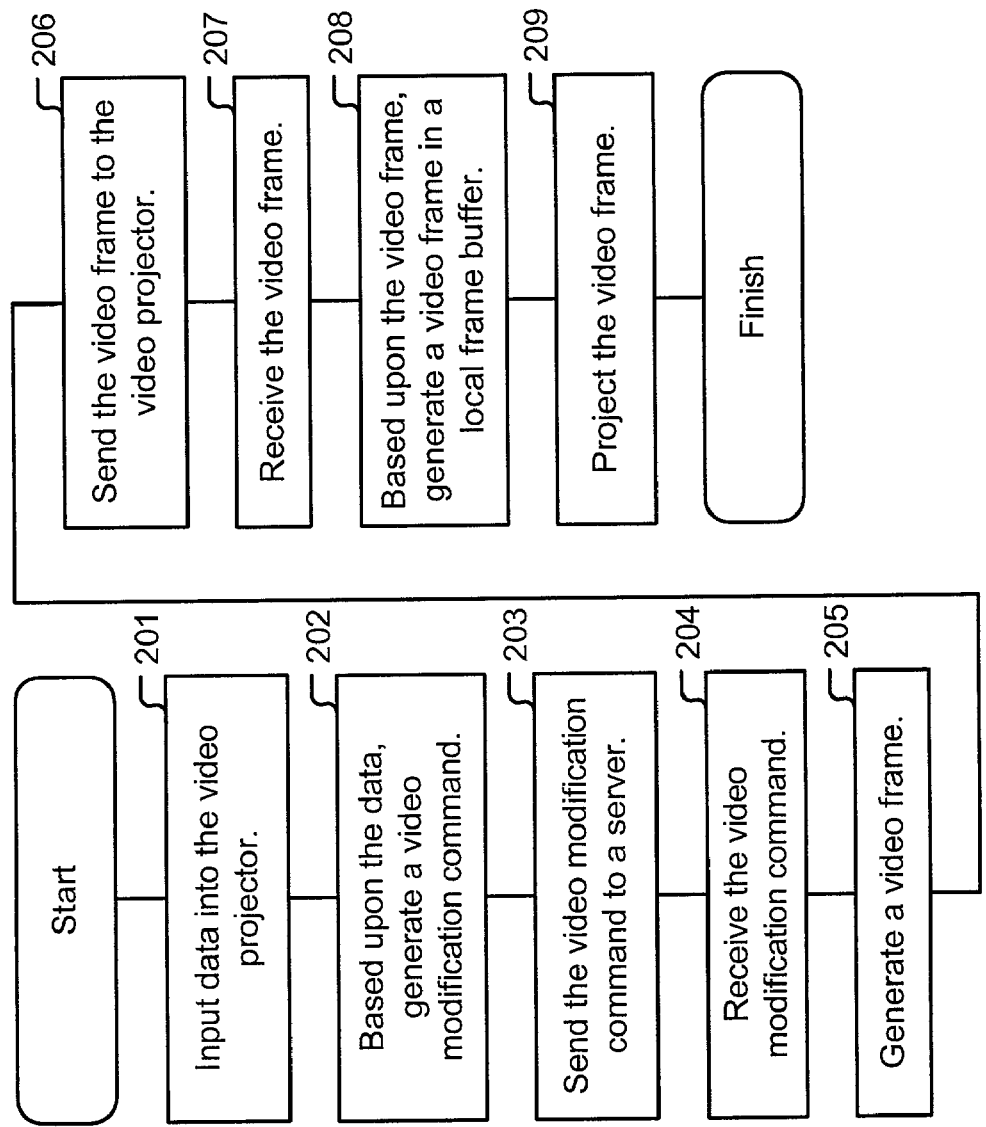

FIG. 1 presents one embodiment of a video projector.
FIG. 2 presents a method of projecting a video frame.

5. DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 Video Projector

One embodiment of the invention is the video projector 100 shown in FIG. 1. This video projector 100 may include a number of electrical components.

5.1.1 Network Adapter

As shown in FIG. 1, the video projector 100 may include a network adapter 110. The network adapter 110 includes one or more ports for sending and receiving data packets. In some embodiments of the invention, the network adapter is operable to send and receive Ethernet data packets, which may or may not be formatted in accordance with the SUN RAY protocol.

5.1.2 Microprocessor

The video projector 100 may also include a microprocessor 120. The microprocessor 120 is conventional. In some embodiments of the invention the microprocessor may be a relatively simple microcontroller. In other embodiments of the invention, the microprocessor may be a high-speed digital signal processor or a high-speed microprocessor.

In some embodiments, the microprocessor 120 is physically coupled to the network adapter 110. For example, the network adapter 110 and the microprocessor 120 may both be included within and directly or indirectly coupled to a video projector housing. In some embodiments of the invention, the microprocessor 120 may be mounted onto a circuit board that includes the network adapter 110. In other embodiments of the invention, the microprocessor 120 may be mounted onto a circuit board that contains an electrical connector. In such embodiments, the network adapter 110 may plug into the electrical connector on the circuit board.

The microprocessor 120 is also electrically coupled, using conventional circuits, to the network adapter 110. As a result, the microprocessor 120 is operable to send data to and receive data from the network adapter 110.

In some embodiments of the invention, the microprocessor 120 is operable to receive and process SUN RAY protocol commands. In addition, the microprocessor may be able to receive and process SET, BITMAP, FILL, COPY, and CSCS commands. Those of skill in the art are familiar with the above commands. Briefly, the SET command sets pixel values of a rectangular region; the BITMAP command expands a bitmap to fill a rectangular region with a (foreground) color where a bitmap contains 1's and another (background) color where the bitmap contains 0's; a FILL command fills a rectangle or region with one pixel value; a COPY command copies a rectangle or region of a frame buffer to another location; and a CSCS command converts a rectangular region from YUV to RGB with optional bilinear scaling.

5.1.3 Memory

The video projector 100 may also include memory 130. The memory 130 is conventional. In some embodiments of the invention, the memory 130 may include DRAM memory, Rambus memory, or SRAM memory.

The memory 130 may be physically coupled to the microprocessor 120. In some embodiments of the invention, the memory 130 and the microprocessor 120 may both be mounted onto a single circuit board. In other embodiments of the invention, the memory 130 may be mounted onto a memory module that contains an edge connector. In such embodiments, the memory module edge connector may plug into an electrical socket on the circuit board in which the microprocessor 120 is mounted.

The memory 130 is also electrically coupled to the microprocessor 120 by conventional circuits. As a result, the memory 130 is operable to receive data from and to send data to the microprocessor 120.

5.1.4 Graphics Adapter

The video projector 100 may also include a graphics adapter 140. The graphics adapter 140 is conventional. The graphics adapter 140 is physically coupled to the microprocessor 120. In some embodiments of the invention, the graphics adapter 140 and the microprocessor 120 are both mounted onto a single circuit board. In other embodiments of the invention, the graphics adapter 140 may include a circuit board with an edge connector. In such embodiments, the graphics adapter 140 may plug into an electrical socket on the circuit board in which the microprocessor 120 is mounted.

The graphics adapter 140 is also electrically coupled to the microprocessor 120 by conventional circuits. As a result, the graphics adapter 140 is operable to receive data from and to send data to the microprocessor 120.

5.1.5 Light Valve

The video projector 100 may also include a light valve 150. In some embodiments of the invention the light valve 150 may utilize liquid crystals to control the passage of light through the light valve 150. Such liquid crystal light valves are well known in the industry. In other embodiments of the invention, the light valve 150 may utilize deformable mirrors to control the passage of light through the light valve 150. Light valves that utilize deformable mirrors are available from Texas Instruments, Inc. Other embodiments of the invention may utilize other type of light valves. Any type of light valve that is operable to selectively block and pass light may be utilized by the invention.

The light valve 150 may be physically coupled to the graphics adapter 140. For example, in some embodiments of the invention, the light valve 150 and the graphics adapter 140 are both included within and directly or indirectly coupled to a video projector housing.

In addition, the light valve 150 is also electrically coupled to the graphics adapter 140. As a result, the light valve 150 is operable to receive data from the graphics adapter 140. In some embodiments of the invention, the light valve 150 may also be operable to send data to the graphics adapter 140.

5.1.6 Light Source

The video projector 100 may also include a light source 160. In some embodiments of the invention, the light source may be an incandescent light bulb. In other embodiments of the invention, the light source 160 may be a fluorescent light bulb. And still other embodiments of the invention, the light source 160 may be any lightemitting component that is operable to generate sufficient light to pass light through the light valve 150.

5.1.7 Input Devices

The video projector 100 may also include one or more input devices. For example, the video projector 100 may include a mouse 170 or keyboard 180. In some of the embodiments, in an effort to reduce costs, the mouse 170 and/or keyboard 180 may be coupled directly to the microprocessor 120. In such embodiments, when a key is pressed on the keyboard 180, the coordinates of the key, such as X and/or Y coordinates, may be sent directly to the microprocessor 120. In other embodiments of the invention, the mouse 170 and the keyboard 180 are indirectly coupled to the microprocessor 120 via a controller. In such embodiments, when a key is pressed on the keyboard 180, such a controller may send the ASCII code of the pressed key to the microprocessor in a serial data format.

In other embodiments of the invention, the video projector 100 may include wireless input devices. For example, the video projector 100 may include a wireless mouse and/or a wireless keyboard. In such embodiments of the invention, the wireless input devices could communicate with the microprocessor via infrared (IR) or radio frequency (RF) serial transmissions. In still other embodiments of the invention, the video projector 100 may receive input data from a touch pad or from a personal digital assistant.

5.1.8 Power Supply

The video projector 100 may also include a power supply 190. The power supply 190 would typically contain an input for receiving AC current and one or more outputs for outputting DC current. The power supply 190 is conventional.

The power supply 190 may be physically coupled to the network adapter 110, the microprocessor 120, the memory 130, the graphics adapter 140, the light valve 150, and the light source 160. In some embodiments of the invention, the power supply would be directly or indirectly mounted to and included within a video projector housing.

The power supply 190 may also electrically be coupled to the network adapter 110, the microprocessor 120, the memory 130, the graphics adapter 140, the light valve 150, and/or the light source 160. Thus, the power supply 190 is operable to provide power to some or all of those components. In addition, the power supply 190 may provide power to one or more input devices.

5.2 Transfer of Information between the Video Projector Components

With the possible exception of the above-described input devices, all of the components described above may be directly or indirectly coupled to and included within a video projector housing. As a result, high-speed digital communications between these devices is possible. For example, in one embodiment of the invention, the video projector 100 can receive data in digital form from the network adapter 110. The microprocessor 120 is able to receive the data in digital form from the network adapter 110 and store the data in memory 130. In addition, the microprocessor 120 can send the digital data to the graphics adapter 140, which can send the data in digital form to the light valve 150. As a result, there is no need to convert the data received by the network adapter 110 into analog form.

5.3 Method of Projecting a Video Frame on a Video Projector

One embodiment of the invention, as shown in FIG. 2, is a method of projecting a video frame on a video projector.

5.3.1 Inputting Data into the Video Projector

Referring to Block 201 of FIG. 2, a user would first input data into the video projector. For example, the user may input data via a wired or wireless keyboard, a wired or wireless mouse, a PDA, or even a touch screen. In one embodiment of the invention, the data would indicate that the user desires to increase or decrease the brightness of a video image.

5.3.2 Generating a Video Modification Command

Next, referring to Block 202 of FIG. 2, the video projector would, based upon the data, generate a video modification command. For example, the video modification command may include an operand and data. In the above example, the operand would indicate that the command is a video brightness command. In such an example, the data would indicate the amount to either increase or decrease the brightness of the video frame.

5.3.3 Sending the Video Modification Command to the Server

Next, referring to Block 203 of FIG. 2, the video projector would send the video modification command to a server. For example, the video projector could send one or more data packets that include the video modification command to the server via a port on the video projector's network adapter.

5.3.4 Receiving the Video Modification Command

After the video projector sends the video modification command to the server, referring to Block 204 of FIG. 2, the server receives the video modification command. In some embodiments of the invention, the server would receive one or more data packets from the video projector. The data packets may adhere to one of the Ethernet protocols. In addition, the data packets may also adhere to the SUN RAY protocol. After the data packets are received, then the server would extract the video modification command from the data packets.

5.3.5 Generating a Video Frame

Then, referring to Block 205 of FIG. 2, based upon the video modification command, the server would generate a video frame. In some embodiments of the invention, the server would generate a video frame in its virtual frame buffer. For example, if the server's virtual frame buffer included a static video frame and the server received a video modification command to increase the brightness of a video frame, then the server would generate a video frame by increasing the brightness of one or more pixels in the server's virtual frame buffer.

On the other hand, if the server was generating a new video frame, i.e., a video frame that has not been generated previously, then the server may first generate an intermediate video frame and then, based upon the intermediate frame, generate the video frame. For example, the server may generate an intermediate video frame that contains an image in a DVD movie. Then, the server would generate a video frame by increasing the brightness of one or more pixels in the intermediate video frame.

5.3.6 Sending the Video Frame to the Video Projector

Next, referring to Block 206 of FIG. 2, the server would send the video frame from the server to the video projector. For example, the server could generate a plurality of data packets that contains the video frame. These data packets would be sent to the video projector. In other embodiments of the invention, only the portion of the video frame that has changed with respect to a prior video frame would be sent from the server to the video projector. As is well known in the art, a number of such compression techniques are utilized to decrease the bandwidth of transmitting a plurality of video frames over networks.

5.3.7 Receiving the Video Frame from the Server

Then, referring to Block 207 of FIG. 2, the video projector would receive the video frame from the server. For example, the video projector would receive one or more data packets that include the video frame, or a portion of the video frame, via a port in the video projector's network adapter. The video projector would then extract the video frame, or the portion of the video frame, from the data packets.

5.3.8 Generating the Video Frame in a Video Projector Frame Buffer

Then, referring to Block 208 of FIG. 2, the video projector would, based upon the received video frame, generate a video frame in a local frame buffer, i.e., a frame buffer within the video projector. In some embodiments of the invention, the local frame buffer would be included within memory 130. In other embodiments of the invention, the local frame buffer would be included within the graphics adapter 140.

5.3.9 Projecting the Video Frame

Finally, as shown in Block 209 of FIG. 2, the video projector would project the video frame.

5.4 Other Video Modification Commands

In other embodiments of the invention, the user would input data related to other video modifications. For example, the user may input data into the video projector that indicates that the user desires to increase or decrease the contrast of a video frame. Alternatively or in addition to, the user may input data into the video projector that indicates that the user desires to translate the video frame, modify the size of the video frame, modify the aspect ratio, i.e., the horizontal width divided by the vertical, of the video frame, and/or reduce the trapezoidal distortion of a projected video frame.

Thus, as discussed above, the video projector could encapsulate the received data into one or more data packets and send the data packets to the server. Then, the server would either utilize the data extracted from the data packets to generate a video frame or generate an intermediate video frame and then utilize the data to generate a video frame. The video frame would then be sent to the video projector and the video projector would project the video frame.

Some embodiments of the invention would utilize a touch screen for inputting data.

5.4.1 Translating a Video Frame

In some embodiments of the invention, the user would input data related to the translation of a video frame. In some of these embodiments, the video projector would display a diagram that represents the video frame on the touch screen. If the user desires to translate the video frame, the user could press the center of the diagram with his finger and then translate the video frame by moving his finger horizontally and or vertically. As a result, the video projector would generate one or more video modification commands that instruct the server to generate a translated video frame, i.e., a video frame that includes at least one pixel, the location of which has been modified. When the server generates the translated video frame, it may or may not also generate an intermediate video frame.

5.4.2 Modifying the Aspect Ratio of a Video Frame

In other embodiments of the invention, the user would input data related to the aspect ratio of a video frame. In some of these embodiments, the video projector would display a diagram that represents the video frame on the touch screen. If the user desires to modify the aspect ratio of a video frame, the user could press the edge of the diagram with his finger and then modify the aspect ratio of the video frame by moving his finger. For example, if the user desires to make a projected video frame narrower, the user could press the right edge of the diagram and then move his finger to the left. As a result, the video projector would generate one or more video modification commands that instruct the server to move the right edge of the video frame to the left. Thus, the video frame would be narrower.

5.4.3 Reducing Trapezoidal Distortion of a Video Frame

In other embodiments of the invention, the user would input data related to the amount of Keystone correction desired. As is well known in the industry, when a video projector is not properly aligned with the display screen, i.e., the projected image is not perpendicular to the display screen, the projected image on the screen undergoes an optical trapezoidal distortion.

In some of these embodiments, the video projector would display a diagram that represents the video frame on the touch screen. If the user desires to modify the amount of Keystone correction to the video frame, the user could press the bottom right edge of the diagram with his finger and then modify the amount of Keystone correction by moving his finger to the left. Similarly, the user could press the bottom left edge of the diagram with his finger and then modify the amount of Keystone correction by moving his finger to the right. As a result, the video projector would generate one or more video modification commands that instruct the server to move the right bottom corner of the video frame to the left and move the left bottom corner to the right. Thus, the trapezoidal distortion can be reduced or eliminated.

5.5 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, many of the above embodiments may be combined. Additionally, the above disclosure is not intended to limit the present invention. The scope of the present invention is defined by the appended claims.

It is claimed:

1. A video projector comprising:
   a) a network adapter;
   b) a microprocessor physically and electrically coupled to the network adapter;
   c) a graphics adapter physically and electrically coupled to the microprocessor;
   d) a light valve physically and electrically coupled to the graphics adapter;
   e) a light source physically coupled to the light valve; and
   f) a housing, the housing containing at least a portion of the network adapter, the microprocessor, the graphics adapter, the light valve, and the light source;
   wherein the video projector is capable of projecting a graphic image onto a screen that is remote from the video projector, is capable of applying Keystone correction to a video frame, and is operable to receive the video frame in digital form from a network and wherein the video projector is operable to transfer the video frame to the microprocessor, the graphics adapter, and the light valve in digital form and wherein the video frame is output from the graphics adapter in digital form.

2. The video projector of claim 1, further comprising a power supply that contains an input for receiving AC current and an output for outputting DC current.

3. The video projector of claim 1, wherein the network adapter includes a port for receiving and sending data packets.

4. The video projector of claim 1, wherein the network adapter includes a port for receiving and sending Ethernet data packets.

5. The video projector of claim 1, wherein the network adapter is operable to receive and send data packets that are formatted in accordance with the SUN RAY protocol.

6. The video projector of claim 1, wherein the microprocessor contains circuitry that is operable to receive and process a SET command, a BITMAP command, a FILL command, a COPY command, and a CSCS command from the network adapter.

7. The video projector of claim 1, wherein the video projector also includes an input device and wherein the microprocessor contains circuitry that is operable to receive data from the input device and, based upon the data, send a video modification command to the network adapter.

8. The video projector of claim 1, wherein the light valve is a liquid crystal light valve.

9. The video projector of claim 1, wherein the light valve contains deformable mirrors.

10. A video projector comprising:
a) a power supply;
b) a network adapter physically and electrically coupled to the power supply;
c) a microprocessor physically and electrically coupled to the power supply and the network adapter;
d) a graphics adapter physically and electrically coupled to the power supply and the microprocessor;
e) a light valve physically and electrically coupled to the graphics adapter;
f) a light source physically coupled to the light valve; and
g) a housing, the housing containing at least a portion of the network adapter, the microprocessor, the graphics adapter, the light valve, and the light source;
wherein the power supply is operable to supply power to the network adaptor, the microprocessor, the graphics adapter and the light valve and wherein a video frame is output from the graphics adapter in digital form and
wherein the video projector is capable of projecting a graphic image onto a screen that is remote from the video projector and is capable of applying Keystone correction to the video frame.

11. The video projector of claim 10, wherein the power supply contains an input for receiving AC current and an output for outputting DC current.

12. The video projector of claim 10, wherein the network adapter includes a port for receiving and sending data packets.

13. The video projector of claim 10, wherein the network adapter includes a port for receiving and sending Ethernet data packets.

14. The video projector of claim 10, wherein the network adapter is operable to receive and send data packets that are formatted in accordance with the SUN RAY protocol.

15. The video projector of claim 10, wherein the microprocessor contains circuitry that is operable to receive and process a SET command, a BITMAP command, a FILL command, a COPY command, and a CSCS command from the network adapter.

16. The video projector of claim 10, wherein the video projector also includes an input device and wherein the microprocessor contains circuitry that is operable to receive data from the input device and, based upon the data, send a video modification command to the network adapter.

17. The video projector of claim 10, wherein the light valve is a liquid crystal light valve.

18. The video projector of claim 10, wherein the light valve contains deformable mirrors.

19. A method of projecting a video frame on a video projector, the method comprising:
a) inputting data into the video projector;
b) based at least in part upon the data, sending a video modification command from the video projector to a server;
c) based at least in part upon the video modification command, generating a video frame;
d) sending at least a portion of the video frame from the server to the video projector; and
e) projecting at least a portion of the video frame.

20. The method of claim 19, wherein inputting the data includes the act of inputting the data into a keyboard.

21. The method of claim 20, wherein the act of inputting data into a keyboard includes sending key coordinate information from the keyboard to the microprocessor.

22. The method of claim 20, wherein the act of inputting data into a keyboard includes sending ASCII codes from a keyboard controller to the microprocessor.

23. The method of claim 19, wherein inputting the data includes the act of inputting data via a mouse.

24. The method of claim 19, wherein the act of inputting the data includes sending serial data.

25. The method of claim 24, wherein the act of inputting serial data includes sending serial data through a wire that is connected to the video projector.

26. The method of claim 19, wherein the act of inputting the data includes sending serial infrared (IR) data.

27. The method of claim 26, wherein the act of sending serial infrared (IR) data includes sending infrared (IR) data from a wireless mouse.

28. The method of claim 26, wherein the act of sending serial infrared (IR) data includes sending infrared (IR) data from a wireless keyboard.

29. The method of claim 19, wherein the act of inputting the data includes sending serial radio frequency (RF) data.

30. The method of claim 29, wherein the act of sending serial radio frequency (RF) data includes sending radio frequency (RF) data from a wireless mouse.

31. The method of claim 29, wherein the act of sending serial radio frequency (RF) data includes sending radio frequency (RF) data from a wireless keyboard.

32. The method of claim 19, wherein the act of inputting the data includes inputting the data into a Personal Digital Assistant.

33. The method of claim 19, wherein the act of inputting the data includes inputting the data into a touchscreen that is coupled to the video projector.

34. The method of claim 33, wherein the act of inputting the data into a touchscreen includes designating portions of the touchscreen that correspond to portions of the frame to be projected and inputting data that represents the location of at least one of those portions.

35. The method of claim 19, wherein the act of sending the command to the server includes sending at least one data packet over a network.

36. The method of claim 19, wherein the act of sending the command to the server includes sending at least one Ethernet data packet over a network.

37. The method of claim 19, wherein the act of sending the command to the server includes sending at least one SUN RAY protocol data packet over a network.

38. The method of claim 19, wherein the act of generating the video frame includes generating a virtual video frame on a server.

39. The method of claim 19, wherein the act of generating the video frame includes generating an intermediate video frame and then, based upon the intermediate video frame, generating the video frame.

40. The method of claim 19, wherein the act of generating the video frame includes generating an intermediate video frame, and then modifying the aspect ratio of the intermediate video frame to generate the video frame.

41. The method of claim 19, wherein the act of generating the video frame includes generating an intermediate video frame, and then modifying the size of the intermediate video frame to generate the video frame.

42. The method of claim 19, wherein the act of generating the video frame includes generating an intermediate video frame, and then modifying the brightness of the intermediate video frame to generate the video frame.

43. The method of claim 19, wherein the act of generating the video frame includes generating an intermediate video frame, and then modifying the contrast of the intermediate video frame to generate the video frame.

44. The method of claim 19, wherein the act of generating the video frame includes generating an intermediate video frame, and then modifying the location of at least one pixel in the intermediate video frame to generate the video frame.

45. A method of modifying a virtual frame buffer on a server, the method comprising:
   a) receiving a data packet from a video projector;
   b) extracting a video modification command from the data packet; and
   c) based at least in part upon the modification command, modifying the virtual frame buffer.

46. The method of modifying the virtual frame buffer of claim 45, further comprising: d) sending at least a portion of the virtual frame buffer to the video projector.

47. The method of modifying the virtual frame buffer of claim 45, wherein the act of modifying the virtual frame buffer includes modifying the color of at least one pixel in the virtual frame buffer.

* * * * *